March 31, 1970   E. L. LONG   3,504,139
THUMBWHEEL TYPE SWITCH
Filed Jan. 24, 1969
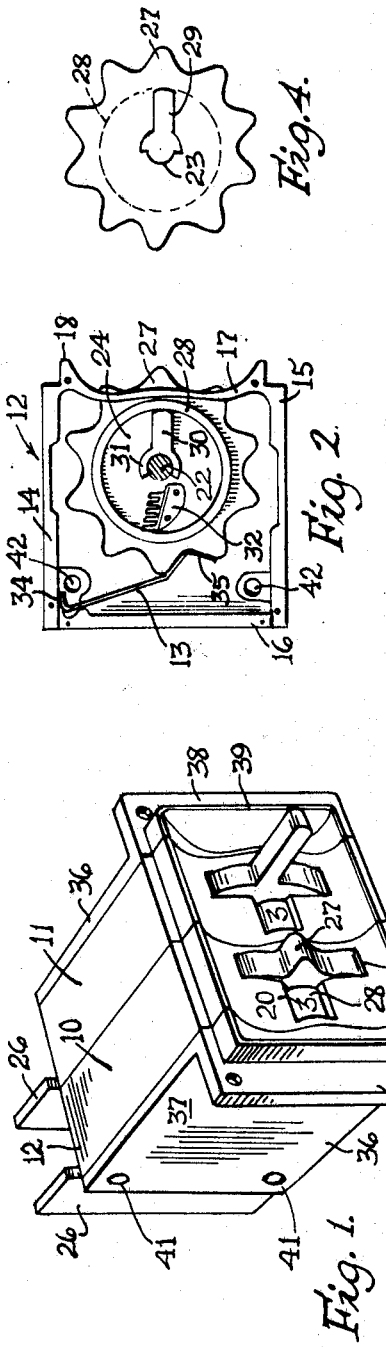
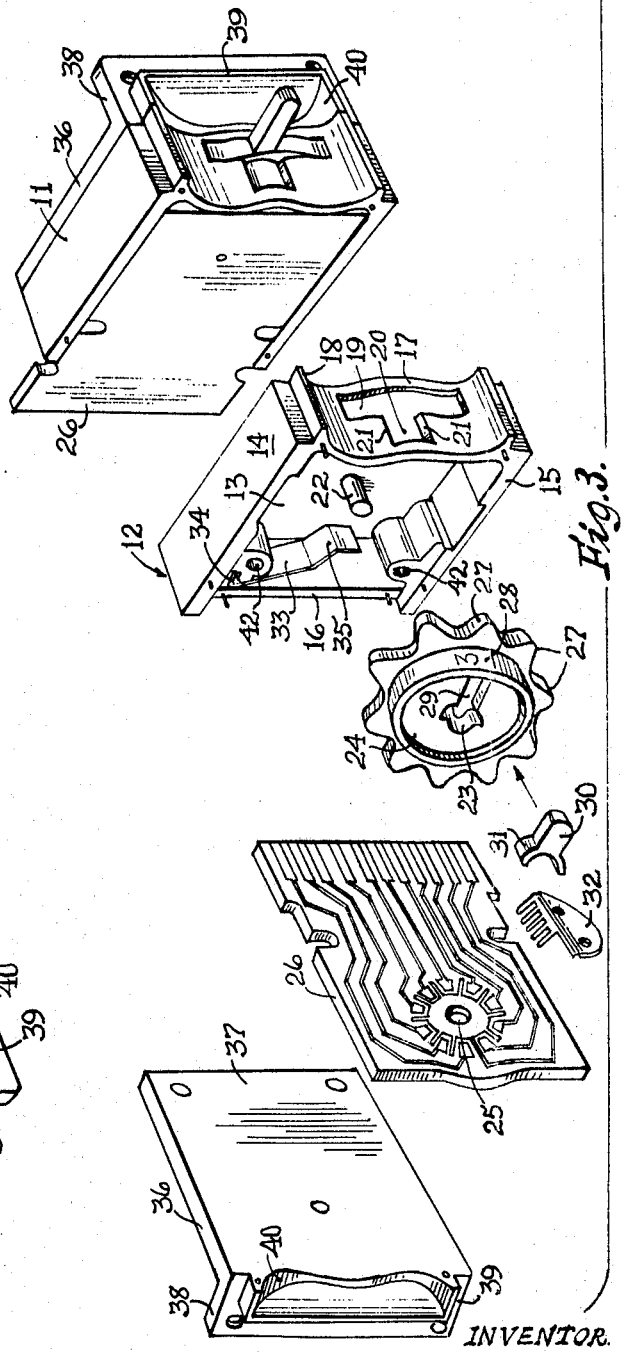
INVENTOR.
ERIC L. LONG.
BY Edward C. Threedy
HIS ATTORNEY.

United States Patent Office 3,504,139
Patented Mar. 31, 1970

3,504,139
THUMBWHEEL TYPE SWITCH
Eric L. Long, Highland Park, Ill., assignor to Cherry Electrical Products Corporation, Highland Park, Ill., a corporation of Illinois
Filed Jan. 24, 1969, Ser. No. 793,846
Int. Cl. H01h *19/58;* F16d *1/06*
U.S. Cl. 200—11  6 Claims

ABSTRACT OF THE DISCLOSURE

A multiple circuit position switch having a finger actuated rotary switch drum housed in a casing having an opening formed in one wall and through which a portion of the drum projects so the same may be rotated about a horizontal axis in either direction with the drum having a limited surface area visible through the opening to indicate a selected circuit switch position, including a means for rotatably connecting said drum upon an axial shaft within the casing.

SUMMARY OF THE INVENTION

A thumbwheel type switch including an open-sided casing normally closed by a printed circuit board and a side closure member. The front wall of the casing has an opening formed therein through which project radially extending finger lugs provided by a rotary switch drum positioned within the casing upon an axial shaft provided thereby, and connected thereto, for rotation thereabout, by a key that is received in a corresponding keyway formed about and in communication with a center opening formed in such rotary switch drum.

The opening in the front wall of the casing is of such a configuration that a limited surface area of the periphery of the drum is exposed so that switch position indicia carried thereon may be viewed therethrough.

GENERAL DESCRIPTION

The invention will be best understood by reference to the accompanying drawing showing one embodiment of the invention and in which:

FIG. 1 is a perspective view of a dual type thumbwheel switch including the switch unit of this invention;

FIG. 2 is a side elevational view showing certain components of the thumbwheel switch of this invention;

FIG. 3 is a perspective view showing the components of the invention in an exploded relation; and FIG. 4 is a side elevational view of one side of the rotary switch drum of this invention.

As shown in FIG. 1, the switch module 10 of the present invention is associated with a switch unit 11, the external casings of which are identical. The switching components of the switch unit 11 make up no part of this invention, but are fully described and claimed in a copending patent application, Ser. No. 813,409, filed Dec. 26, 1968.

The multiple circuit position switch of the present invention is housed in an open-sided casing 12 that includes a side wall 13, top and bottom walls 14 and 15, and rear and front walls 16 and 17.

The front wall 17 is provided with laterally projecting flanges 18 that define therebetween a preformed curved front wall section. Between the flanges 18 and entirely within the curved wall section of the casing is formed an elongated slot 19. A window 20 of a size less than that of the slot 19 is formed in the front wall 17, and is defined by spaced apart opposing outwardly curved lip members 21. It should be noted that both the slot 19 and window 20 are entirely within the confines of an actuating area prescribed between flanges 18 of the front wall 17.

Located within the cavity of the casing 12 and projecting inwardly thereof away from the side wall 13 is an axial shaft 22. This shaft 22 is adapted to be projected through a center semi-circular opening 23 formed in a rotary switch drum 24 as well as a centering aperture 25 formed in a printed circuit board 26.

The switch drum 24 is formed to provide a plurality of radially extending lugs 27 that are adapted to be projected out of the enlarged slot 19 formed in the front wall 18 of the casing 12 when the drum 24 is placed about the shaft 22. These lugs 27 are so spaced that they will receive therebetween the distal portion of an operator's finger, and at least one of such lugs project, at any one circuit position of the switch, radially out of the slot 19, as shown in FIGS. 1 and 2.

A reduced peripheral edge 28 of the drum 24 is positioned behind the outwardly curved lip member 21 such that a limited surface area thereof is visible through the reduced window 20 formed in the front wall 17 of the casing 12.

The switch drum 24 has formed therein a keyway 29 that is in open communication with and extends radially from its center opening 23. As seen in FIG. 2 the axial shaft 22 is positioned off center and in closer proximity to the curved front wall 17 of the casing 12, such that the distance between the front wall 17 and the shaft 22 is slightly greater than the radius of the reduced peripheral edge 28 of the drum 24. Thus to mount the drum 24 about the shaft 22 requires that the shaft 22 be first projected through a part of the keyway 29, and then as the drum 24 is moved forward toward the front wall 17, and a lug 27 is projected out of an enlarged slot 19, the shaft 22 will move through the keyway 29 until it contacts the rear circular bearing portion of the center opening 23 as shown in FIG. 2.

After the drum 24 has been placed about the shaft 22 within the cavity of the casing 12, a key 30 is frictionally placed in the keyway 29. The key 30 as shown in FIGS. 2 and 3 provides a semicircular bearing end 31 that produces a circular surface which embraces a part of the shaft 22, and cooperates with the complementary surface of the opening 23 formed in the drum 24, to rotatably position the drum 24 upon the shaft 22 within the casing 12.

Carried on the side of the drum 24 that confronts the printed circuit board 26 is a wiper blade 32. As the drum is caused to rotate in either direction through the manipulation of manually moving the exposed lug 27 through the enlarged slot 19 formed in the front wall 18 of the casing 12, such wiper blade 32 is rotated over the printed circuits on the board 26 into a selected number of circuit making positions.

A switch positioning index means is contained within the casing 12. This means comprises a flat spring 33, one end of which is bent to form a lateral flange 34 that is captured in the interior corner of the casing 12, which corner is defined by the rear wall 16 and its junction with the top wall 14 as shown in FIGS. 2 and 3. The opposite end of the spring 33 is preformed as at 35 so as to be yieldably received between corresponding lugs 27 provided by the drum 24. By this arrangement the spring 33 will yieldably index the rotatable movement of the drum 24 in either direction about the shaft 22.

In assembly, the switch module 10 may be mounted between the switch unit 11 and an end closure member 36 as shown in FIG. 1 or between two cooperative end closure members. In this regard the end closure members 36 are similar in construction except for obvious opposite configurations as will be noted. Each end closure member 36 comprises a flat wall 37 that terminates at its forward end into a laterally extending front wall flange 38. Each of the front wall flanges 38 provide outwardly projecting wall abutments 39 that define a curved front wall surface 40 which corresponds to the curved front wall 17 of the switch casing 12.

Adjacent the rear edge of each of the end walls 37 of each end closure member 36 there are formed horizontally aligned openings 41 which are adapted to be in horizontal alignment with openings 42 formed in the corresponding rear corners of the casing 12 and through which may be projected the connecting means by which each modular switch unit is assembled.

From the foregoing it is obvious that the disclosed invention provides a sealed casing for a movable multiple position switch unit which includes an integral front wall having only an opening formed therein through which the actuating lugs of the rotatable switch drum project. The foregoing disclosure illustrates a novel means of connecting a multiple positioned switch contact member within a switch casing whereby the multiple switch contact member may be rotated through 360 degrees in either direction to any selected switch registering position.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. In a multiple position digital switch having an open-sided casing providing therein a cavity in which is positioned a rotary switch structure including a circuit making contact member movable over a printed circuit board wherein the improvement comprises:
    (a) a preformed front wall for the casing having a defined actuating area,
    (b) an elongated slot formed entirely within said defined actuating area of said front wall,
    (c) an axial shaft within said casing and extending in the direction of the open side thereof, and in a predetermined spaced relation with respect to said front wall,
    (d) an actuator carrying the circuit making contact member mounted on said shaft and including a peripheral portion having a radius greater than the distance between said shaft and said front wall so as to extend out of said slot formed within said defined actuating area,
    (e) means formed in said actuator freely receiving said shaft when said actuator is initially mounted thereabout permitting transverse movement of said actuator relative to said axial shaft so that said peripheral portion of said actuator may be projected out of said slot formed in said front wall when said actuator is mounted for rotation about said shaft,
    (f) means for rotatably mounting said actuator upon said shaft and for retaining said peripheral portion thereof in a position extending out of and movable through said slot whereby said actuator and the circuit making contact member may be rotated about said shaft, and
    (g) means for closing the open side of said casing when said actuator is rotatably mounted on said shaft by said mounting means.

2. In a multiple position digital switch as defined by claim 1 wherein said means formed in said actuator that freely receives said shaft is a keyway having a predetermined configuration in open communication with a semicircular opening formed centrally in said actuator with said keyway being of a size to freely receive therein for movement therethrough said axial shaft.

3. In a multiple position digital switch as defined by claim 1 wherein said means for rotatably mounting said actuator upon said shaft comprises a key which cooperates with said means formed in said actuator for rotatably mounting said actuator upon said shaft and for preventing transverse movement of said actuator relative to said axial shaft.

4. In a multiple position digital switch as defined by claim 2 wherein said means for rotatably mounting said actuator upon said shaft comprises a key corresponding in configuration to said keyway and providing at one end a semicircular bearing that cooperates with the semicircular opening formed in said actuator for rotatably mounting said actuator on said shaft, and for preventing transverse movement of said actuator relative to said axial shaft.

5. In a multiple position digital switch as defined by claim 1 wherein said means for closing the open side of said casing comprises a side closure member including a flush side wall covering the open side of said casing and having a front wall preformed to correspond to said preformed front wall of said casing, and having a defined actuating area corresponding to said defined actuating area on said front wall of said casing.

6. In a multiple position digital switch as defined by claim 4 wherein said means for closing the open side of said casing comprises a side closure member including a flush side wall covering the open side of said casing and having a front wall preformed to correspond to said preformed front wall of said casing, and having a defined actuating area corresponding to said defined actuating area on said front wall of said casing.

References Cited

UNITED STATES PATENTS

| | | | |
|---|---|---|---|
| 2,825,772 | 3/1958 | Jones. | |
| 2,826,934 | 3/1958 | Jakeway | 74—553 |
| 3,089,923 | 5/1963 | Wright | 200—11 |
| 3,250,148 | 5/1966 | Soles | 74—553 XR |
| 3,329,452 | 7/1967 | Ammon | 74—553 XR |

ROBERT K. SCHAEFER, Primary Examiner

J. R. SCOTT, Assistant Examiner

U.S. Cl. X.R.

74—548, 553; 287—53